3,203,803
LIGHT-SENSITIVE DIAZO HEXAFLUORO-
PHOSPHATE COMPOSITIONS
David P. Habib, West Springfield, and George R.
Hodgins, South Hadley, Mass., assignors to
Tecnifax Corporation, Holyoke, Mass., a corporation of Massachusetts
No Drawing. Filed Jan. 20, 1964, Ser. No. 338,618
1 Claim. (Cl. 96—91)

This application is a continuation-in-part of applicants' application Serial No. 136,432, filed September 7, 1961, now abandoned.

This invention relates to light-sensitive diazo-type materials and more particularly to stabilized diazo-salt compounds for use in preparing diazo formulations for sensitizing base materials.

As is well known, the diazo process comprises the application of a light-sensitive diazo-salt composition to a carrier or base which may be paper or transparent film, such as cellulose acetate or a plastic-coated base support. In the dry development or two-component process, the sensitizing composition comprises a diazo compound, a coupling component or color former, and an acidic coupling inhibitor. In diazo reproduction, the sensitized base is exposed to ultraviolet light, through a pattern having opaque image portions. The unmasked portions of the diazo are decomposed by the light. Development to obtain an azo dye image is accomplished by placing the exposed material in an alkaline atmosphere which neutralizes the acidic inhibitor, allowing the undecomposed diazo and coupler to react.

In sensitizing formulations, the diazos are usually in the form of stabilized compounds of acidic salts such as zinc chloride, cadmium chloride, stannic chloride, and boron trifluoride. These salts are used to stabilize the diazo and also to enhance the keeping quality or shelf life of the sensitized diazotype material. It is also the general practice to provide some means of inhibiting print discoloration and image fading. To achieve this end, various additives are generally used in diazo formulations, such as thiourea, thiourea derivatives and other similarly-acting compounds. Zinc chloride is also generally used as an additive in diazo formulations to further improve the shelf life of the diazotype materials.

Notwithstanding the use of various stabilizers and additives in diazotype formulations, stability or shelf life characteristics of diazotype materials have not been entirely satisfactory, particularly in diazotype materials sensitized with formulations employing diazos noted for their high coupling activity and/or instability.

The principal object of this invention is to provide improved light-sensitive formulations for the diazotype process.

Another object of this invention is to provide diazosalt compounds for use in light-sensitive diazotype coating formulations having improved characteristics.

A further object of this invention is to provide diazosalt compositions having improved stability, shelf life and compatibility with plastic materials which are used as carriers in the diazotype process.

Another important object of this invention is to provide an economical method of preparing a variety of diazos, and to make practicable the commercial utilization of many diazos, which have heretofore been considered uneconomical or difficult to manufacture.

Still another object of this invention is to provide improved diazo plastic products.

The above and other objects and advantages of this invention will be more readily apparent from the following description:

In accordance with this invention, diazo compounds, for use in light-sensitive diazotype materials, are prepared and used as the hexafluorophosphate salt of the diazo.

Diazo formulations of improved characteristics are obtained by using the reaction product of a hexafluorophosphate compound and a diazo compound. This can be accomplished by means of a double decomposition reaction, which yields the diazohexafluorophosphate salt represented by the following general formula: $ArN_2PF_6$; in which Ar is any substituted phenyl group, as for example derivatives of phenylene diamine, amino-phenol, amino-hydroquinone, amino-thiophenol, amino-toluene, and chloraniline.

Hexafluorophosphate compounds used to prepare this new type of stabilized diazosalt may be in the form of the acid or any of its salts, as long as the salt selected is more soluble in the reaction media than the diazo hexafluorophosphate being prepared. The hexafluorophosphate compound may be represented as: $MPF_6$ in which M represents hydrogen, metallic or other cation, as for example K, Na or ammonium salts.

Diazo compounds which may be used in carrying out the invention are represented by the following general formula: $ArN.X$ in which X represents an anion capable of producing stable diazo compounds such as: $Cl^-$, $SO_4^=$, $ZnCl_4^=$, $SnCl_6^=$, $CdCl_4^=$.

Preparation of a hexafluorophosphate diazosalt may be illustrated by the following equation:

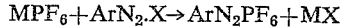

$$MPF_6 + ArN_2.X \rightarrow ArN_2PF_6 + MX$$

This equation represents a double decomposition reaction, and is preferably carried out in an aqueous medium. The diazosalt, $ArN_2.X$, is dissolved in the reaction medium. The hexafluorophosphate salt is then introduced into the solution. The solution may be stirred to accelerate dissolution of the hexafluorophosphate salt. The amount of $MPF_6$ added to the solvent is preferably slightly in excess of the stoichiometrical amount required for reaction with the diazo, which is a 1:1 molar ratio.

The diazo cation $ArN_2^+$ and the $PF_6^-$ anion always combine in a 1:1 molar ratio and thus the exact composition of the reaction product $ArN_2PF_6$ is precisely predictable and does not vary from reaction to reaction. This stoichiometry permits more exact control of the formulations used in sensitizing diazotype products. Precipitation of $ArN_2PF_6$, illustrated by the above equation, usually occurs without further treatment of the solution, although under certain conditions it may be desirable to initiate precipitation of the diazosalt by cooling or seeding the solution.

Because diazosalts are usually prepared by ionic reactions in aqueous media and are recovered by precipitation, the yield depends on the solubility product of the diazosalt in the reaction media. Consequently, diazosalts of lower solubility in water can be more economically recovered than those which are more soluble. Many otherwise valuable diazos have not attained commercial importance in the diazotype process because of the relative difficulty encountered in recovering or isolating the diazos as stabilized salts of zinc chloride, cadmium chloride, stannic chloride, boron trifluoride, and like conventionally-used stabilizing salts for diazos. It has been found that the PF$_6$ radical imparts a property of lower water solubility to diazos with which it is combined in accordance with the equation given above. This facilitates the economical manufacture of a variety of stabilized diazosalts by double decomposition reaction in aqueous media.

In accordance with this invention the following are examples of a number of specific diazo compounds which may be reacted with a hexafluorophosphate salt:

4-N,N-dimethylamino-benzenediazonium chloride
4-N,N-diethylamino-benzenediazonium chloride
4-N-ethyl-N-hydroxyethylamino-benzenediazonium chloride
4-N-methyl-N-hydroxyethylamino-benzenediazonium chloride
4-N-ethylamino-benzenediazonium chloride
4-N,N-diethylamino-2-methylbenzenediazonium chloride
4-N-ethyl-N-benzylamino-benzenediazonium chloride
4-N,N-diethylamino-3-chlorobenzenediazonium chloride
4-N-morpholino-2,5-diethoxybenzenediazonium chloride
4-(p-tolylthio)-2,5-diethoxybenzenediazonium chloride
4-(p-chlorophenoxy)-2,5-diethoxybenzenediazonium chloride
4-(p-ethoxyphenyl)-2,5-diethoxybenzenediazonium chloride
4-N,N-bis-(B-hydroxyethyl)-aminobenzenediazonium chloride
4-N-pyrrolidino-3-methyl-benzenediazonium chloride
4-N-morpholino benzenediazonium chloride
4-N(2,6-dimethyl morpholino) benzenediazonium chloride
4-N-piperidino benzenediazonium chloride
4-N-pyrrolidino benzenediazonium chloride
4-N-hexamethyleneimino benzenediazonium chloride
4-N-piperizino benzenediazonium chloride
4-N(N'methyl piperizino) benzenediazonium chloride
4N[N-(3 aza bicyclo 3.2.2 nonane)] benzenediazonium chloride
4-N[N'-($\beta$-hydroxyethyl) piperizino] benzenediazonium chloride
4-N(N'-acetyl piperizino) benzenediazonium chloride Listed below are a number of specific examples of light-sensitive diazotype formulations which include as a light-sensitive constituent hexafluorophosphate stabilized diazosalts. These examples are intended to be illustrative of the invention, rather than limiting in nature.

*Example I*

| Solvent system: | Grams |
|---|---|
| Methanol | 50 |
| Acetone | 50 |
| Coupling inhibitor—tartaric acid | 1.5 |
| Stabilizer—zinc chloride | 0.5 |
| Background inhibitor—thiourea | 0.5 |
| Coupler—resorcinol, 3,5 dihydroxy benzoic acid | 1.2 |
| Diazosalt—4-(N,N-dimethylamino) benzene diazonium hexafluorophosphate | 2.0 |

*Example II*

Solvent system:
| Methanol | 50 |
|---|---|
| Acetone | 50 |
| Coupling inhibitor—citric acid | 1.5 |
| Stabilizer—zinc chloride | 0.5 |
| Background inhibitor—thiourea | 0.5 |
| Coupler—B-oxynaphthoic acid, mono-ethanol amide | 1.2 |
| Diazosalt—4-(N,N-diethylamino) benzene diazonium hexafluorophosphate | 2.0 |

*Example III*

Solvent system:
| Methanol | 50 |
|---|---|
| Acetone | 50 |
| Coupling inhibitor—tartaric acid | 1.5 |
| Stabilizer—zinc chloride | 0.5 |
| Background inhibitor—thiourea | 0.5 |
| Coupler—resorcinol, 3,5 dihydroxy benzoic acid | 1.0 |
| Diazosalt—4-N-morpholino-2,5 diethoxybenzene-diazonium hexafluorophosphate | 1.0 |

Diazotype materials were made using the formulations illustrated in Examples I, II and III which were applied to plastic layers or carriers. It was found these diazotype materials exhibited a degree of resistance to "blushing" and background discoloration which constituted a marked improvement over corresponding diazo sensitized materials stabilized by other means. The condition known as "blushing" is a result of poor compatibility of the diazosalt with the plastic layer, producing a haze on the plastic layer which impairs its transparency and general appearance. The PF$_6$ radical minimizes "blushing" since it not only imparts a property of lower water solubility to diazos with which it is combined, but also increases the solubility of the diazo compounds in organic solvents, such as ketones, alcohols, and the like, used for applying diazo formulations to plastic layers.

Diazo hexafluorophosphate salts prepared in accordance with this invention have been found to possess the following advantageous characteristics:

(1) In the manufacture of diazo compounds, the PF$_6$ radical imparts a property of lower water solubility to diazos and thus facilitates isolation and economical attainment of improved yields. In some instances, diazos can be obtained that have otherwise proven to be difficult or even impossible to isolate.

(2) Diazo hexafluorophosphate salts improve the shelf life characteristics of diazotype products. This is an important consideration because any extension of shelf life adds to the marketability and quality of a diazotype product.

(3) Diazo hexafluorophosphate salts are characterized by a relatively higher degree of solubility in organic solvents than conventional diazosalts used in sensitizing plastic layers. Moreover, diazo hexafluorophosphate salts have excellent compatibility with plastic layers used in the diazotype process. These properties are important since they minimize the tendency of "blushing" and background discoloration.

(4) Unlike zinc chloride and many other acid-salt combination systems, the stoichiometry of the PF$_6$ diazosalt is precisely predictable. This is a significant advantage, since the exact composition of the reaction product is always known. Thus, it provides more exact control over the formulation used in sensitizing diazotype products.

(5) The relatively low water solubility of diazo hexafluorophosphate compounds and high solubility in organic solvents produces sensitizing formulations having azo dye images of higher density than conventional salts of the same diazo.

While the above description is primarily related to diazo hexafluorophosphate salts having the advantages described above, it is to be understood that hexafluorophosphates, as either an acid or salt, may also be advantageously employed as ingredients or components of diazo formulations to provide improved stability.

Having thus described this invention, what is claimed is:
A diazotype light-sensitive material comprising a sheet material sensitized with a composition consisting essentially of a daizonium hexafluorophosphate, a diazo coupling component, and an acidic coupling inhibitor, said diazonium hexafluorophosphate being a para substituted compound in which the para substituent is selected from the group consisting of dialkylamino, arylamino, aralkylamino, phenoxy, phenyl thio ether, N-(3 aza bicyclo 3.2.2 nonane), morpholino, piperidino, pyrrolidino, hexamethyleneimino and piperizino.

References Cited by the Examiner
UNITED STATES PATENTS

| | | | |
|---|---|---|---|
| 2,694,010 | 11/54 | Botkin et al. | 96—91 |
| 2,915,396 | 12/59 | Straw | 96—91 |

FOREIGN PATENTS 682,614  11/52  Great Britain.

OTHER REFERENCES

Saunders: The Aromatic Diazo Compounds, Edward Arnold & Co., London, 1949, pp. 80–81.

Deutsche Chemische Berichte, Berlin, vol. 63, 1930, pp. 1058–1068.

NORMAN G. TORCHIN, *Primary Examiner.*